United States Patent [19]

Groth et al.

[11] 4,073,346

[45] Feb. 14, 1978

[54] COMBINATION TRACTOR AND FARM IMPLEMENT HITCH MEANS

[75] Inventors: Roger L. Groth, Battle Creek; Randall L. Harvey, Davenport; Thomas R. Lauer, Iowa City, all of Iowa; Morris L. Ronnebaum, Bismarck, N. Dak.

[73] Assignee: Iowa State Univ. Research Foundation, Inc., Ames, Iowa

[21] Appl. No.: 692,934

[22] Filed: June 4, 1976

[51] Int. Cl.² .................. B60D 1/00; A01B 59/043
[52] U.S. Cl. .................................. 172/439; 172/443; 172/451
[58] Field of Search ............... 172/439, 138, 47, 451, 172/443, 175, 195, 448, 624, 691, 677, 248, 59; 280/461 A, 415 A, 460 A; 111/59, 52, 1

[56] References Cited

U.S. PATENT DOCUMENTS

| 2,575,622 | 11/1951 | Fraga | 172/448 X |
| 3,140,103 | 7/1964 | Virtue | 172/448 |
| 3,472,528 | 10/1969 | Richey | 172/439 |
| 3,810,434 | 5/1974 | Van der Lely | 172/59 |
| 3,937,460 | 2/1976 | Van der Lely | 172/439 |
| 3,949,813 | 4/1976 | Lely | 172/59 |
| 3,977,476 | 8/1976 | Van der Lely | 172/439 |
| 3,983,943 | 10/1976 | Lely | 172/59 |

Primary Examiner—Richard J. Johnson
Attorney, Agent, or Firm—Rudolph L. Lowell

[57] ABSTRACT

A first farm implement having a front three-point hitch connection for mounting on a tractor is equipped with a rear three-point hitch means for connection with a front three-point hitch means on a second farm implement so that both farm implements can be lifted and towed in tandem fashion, or each implement can be individually lifted or towed by a single tractor. The first implement includes an elongated transverse tool bar which carries the respective connections of both the front and rear three-point hitch means therefor in alignment longitudinally of the tractor.

2 Claims, 8 Drawing Figures

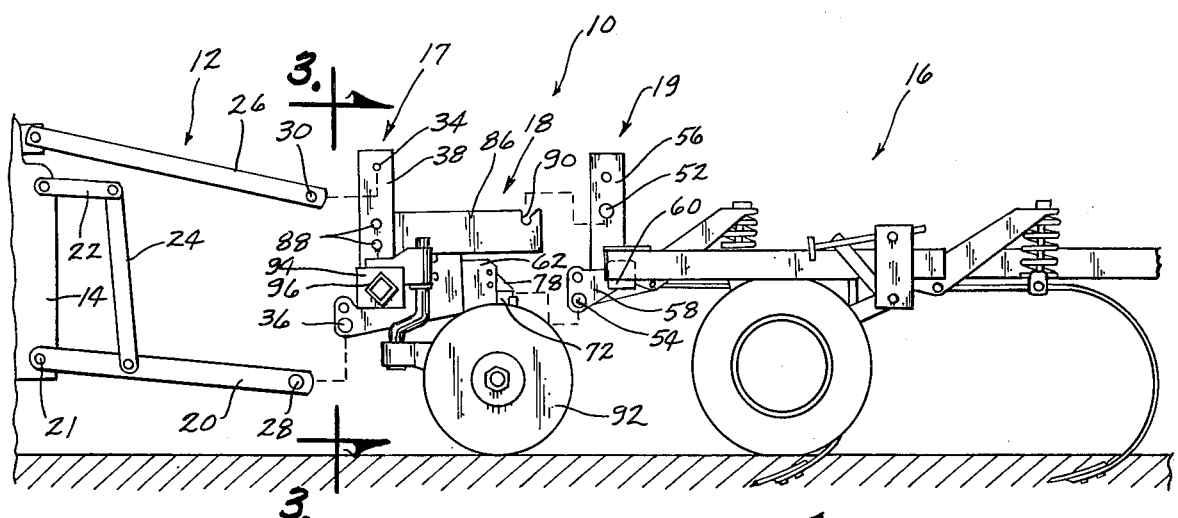
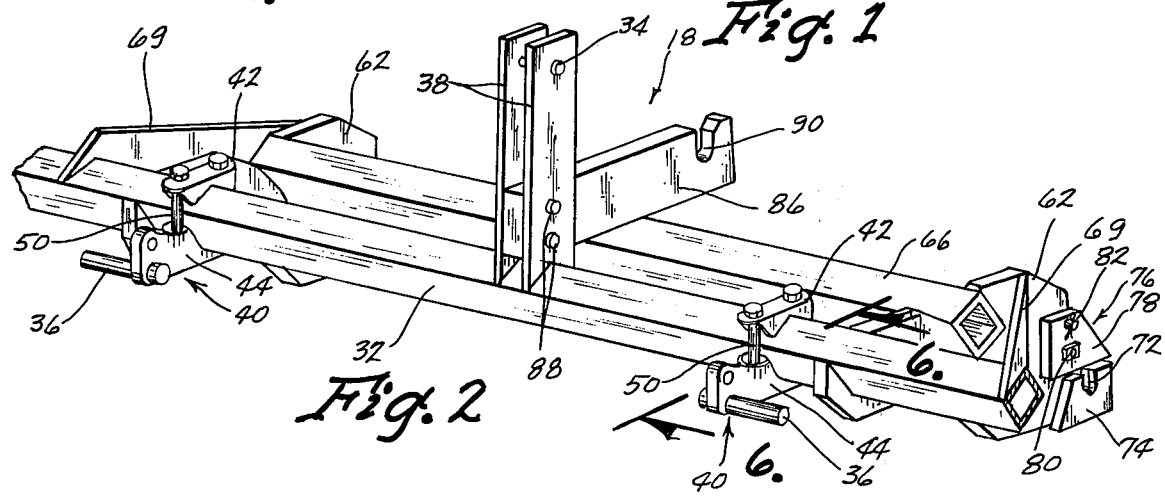
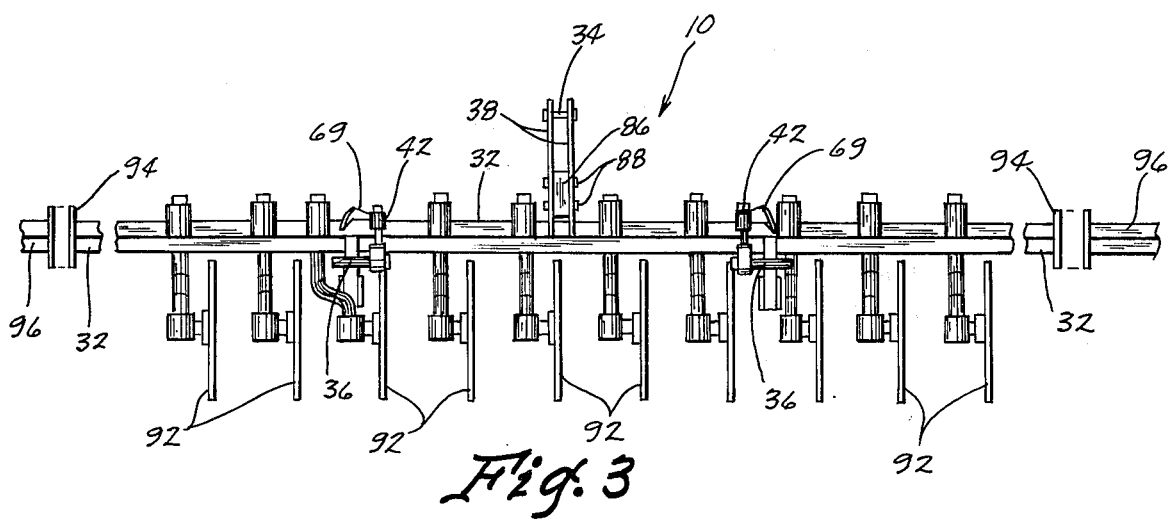

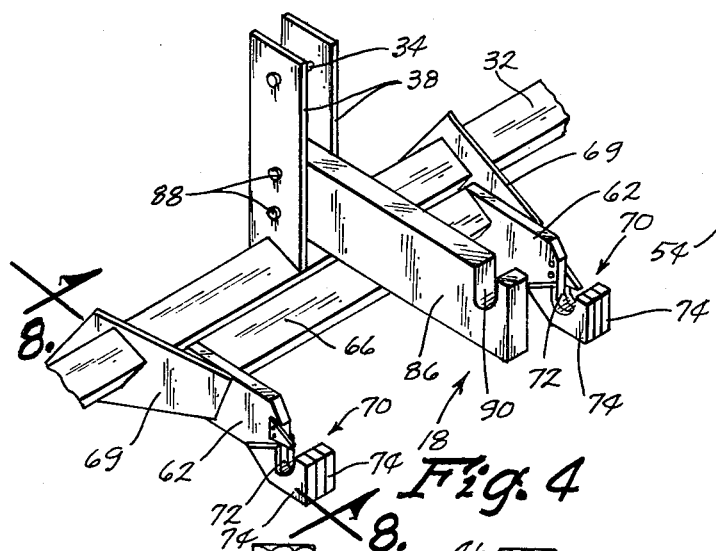
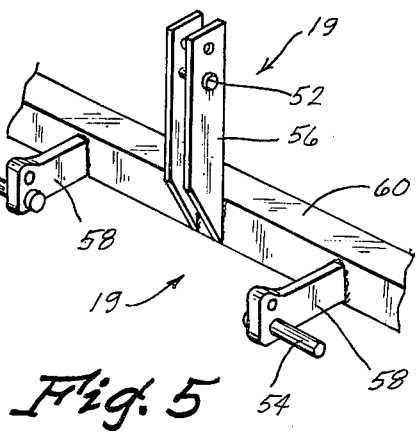
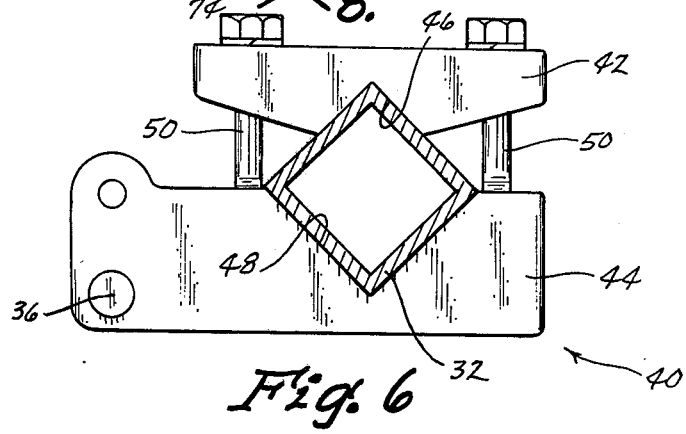
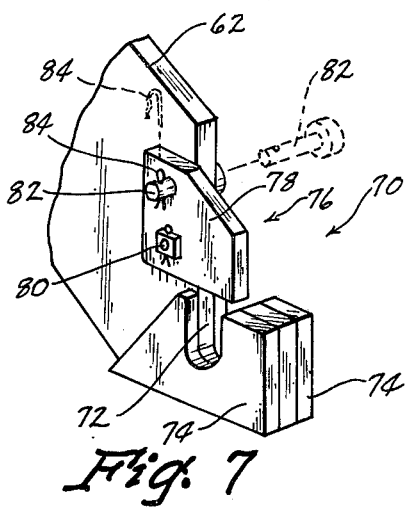
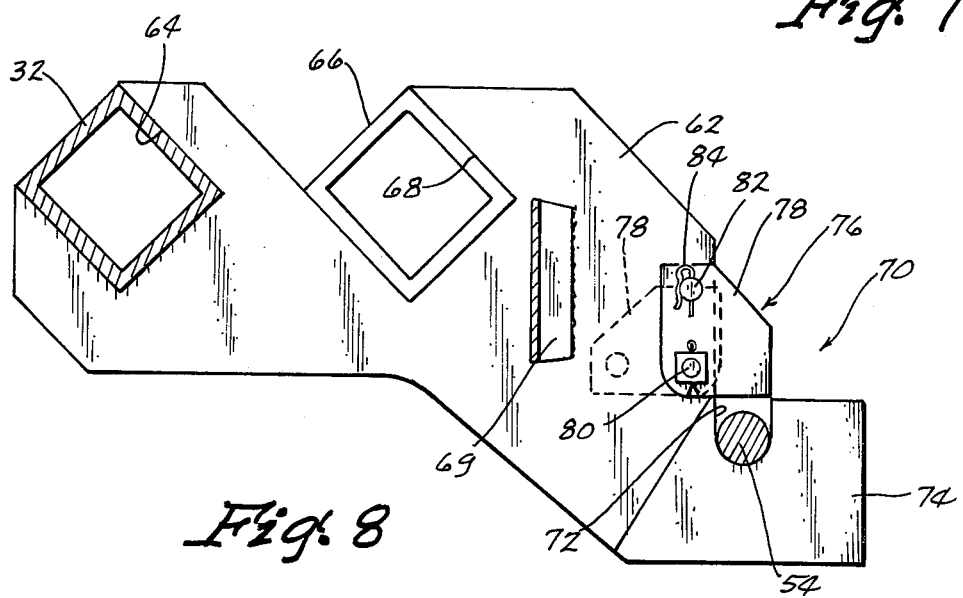

COMBINATION TRACTOR AND FARM IMPLEMENT HITCH MEANS

SUMMARY OF THE INVENTION

A primary feature of the first farm implement of the present invention is its detachability. In other words, the first implement may be attached directly to the three-point hitch of a tractor and used alone. Similarly, it may be used in combination with a second implement mounted on the rear hitch means of the first implement. Still further, the first implement may be detached entirely and the second implement may be attached directly to the three-point hitch of the tractor. The rear three-point hitch means on the first implement accounts for such detachability by permitting a three-point connection between two pieces of farm equipment which are both designed for independent mounting directly on the three-point hitch of a tractor. It is readily apparent that such a connection is applicable to any pair of implements that one might wish to use separately or in combination.

BRIEF DESCRIPTION OF THE DRAWINGS

FIG. 1 is a side elevation view of the improved implement of the present invention showing the manner in which it is connectible in a three-point hitch connection with a tractor and with a second implement, with dotted lines indicating the parts to be connected;

FIG. 2 is a detail perspective view of the tool bar of the improved implement with the tools removed and showing the front three-point connection therefor;

FIG. 3 is a foreshortened front elevation view of the improved implement taken on line 3—3 in FIG. 1;

FIG. 4 is a detail perspective view of the improved implement showing the rear three-point connection therefor;

FIG. 5 is a detail perspective view of the second farm implement showing its front three-point hitch connection;

FIG. 6 is an enlarged sectional detail view taken on line 6—6 in FIG. 2 showing the lower hitch pin bracket on the tool bar of the improved implement;

FIG. 7 is an enlarged perspective view showing the lock means for a lower hook of the rear three-point hitch connection of the improved implement; and FIG. 8 is an enlarged sectional view taken on line 8—8 in FIG. 4.

DETAILED DESCRIPTION OF THE INVENTION

The three-point hitch tractor mounted farm implement of this invention, indicated generally at 10, is shown in FIG. 1 as being connectable to a three-point hitch 12 of a tractor 14 and connected in a three-point hitch connection to a second implement 16. For convenience, the implement 10 will be referred to as the first implement, and the implement 16 as the second implement. The dotted lines in FIG. 1 indicate the three-point connections of the hitch means 17 of the first implement 10 to the tractor three-point hitch 12 and the three-point connections of the rear hitch means 18 of the first implement 10 to the front three-point hitch connections 19 of the second implement 16.

Both the first implement 10 of the present invention and the second implement 16 can be independently mounted on the three-point hitch 12 of a tractor 14. A typical three-point tractor hitch 12, as shown in FIG. 1, includes a pair of elongated laterally spaced lift arms 20 which are pivotally connected to the rear end of the tractor 14 as at 21. The lift arms 20 are raised and lowered by a power lift means illustrated as including a pair of crank arms 22 and a corresponding pair of links 24 pivotally interconnecting the lift arms 20 and crank arms 22. Thus, oscillation of the crank arms 22 by a power source (not shown) on the tractor 14 is effective to raise and lower the lift arms 20.

A center arm 26, constituting the third connection of the three-point hitch 12 is pivotally mounted on the tractor 14 above and between the lift arms 20 and extends rearwardly from the tractor 14 approximately the same distance as the lift arms 20.

A bore 28 is formed in each lift arm 20 adjacent its rear end to act as the fastening means for mounting implement 10 or 16 on the tractor three-point hitch.

A similar bore 30 or other fastening means is utilized on the rear end of the center link 26 to complete the three-point connection to a farm implement.

Referring to FIG. 2, the first implement 10 of the present invention includes an elongated transverse tool bar 32. Mounted on the tool bar 32 for connecting it to the three-point hitch 12 of a tractor is the front three-point hitch means which includes an upper hitch pin 34 (FIGS. 2 and 3) and a pair of laterally spaced lower hitch pins 36. The upper hitch pin 34 is extended transversely between a pair of upstanding laterally spaced mast plates 38 which are rigidly secured to the tool bar 32 and arranged to generally center the upper hitch pin 34 on the tool bar 32. The mast plates 38 and tool bar 32 together constitute the frame of the implement.

Lower hitch pin 36 (FIGS. 2 and 6) extend laterally outwardly from hitch pin clamps 40 which include top and bottom portions 42 and 44, respectively, having inner surfaces 46 and 48, also respectively, that are knotched or cut out to receive the tool bar 32 therebetween. The hitch pin clamp portions are connected together by a pair of bolts 50 disposed on either side of the tool bar 32. The exact configuration and construction of the mast plates 38 and lower hitch pin clamps 40 are not critical to the present invention but rather, the many commercial forms of front three-point hitch means presently available for implements are generally equally suitable.

In order to mount a second three-point hitch mounted type implement 16 (FIG. 1) onto the first implement 10 of the present invention, rather than directly to the three-point hitch 12 of a tractor, a rear three-point hitch means 18 (FIG. 4) is provided on the first implement 10. The construction and connection of the rear hitch means 18 will be better understood following a description of the front hitch means 19 (FIG. 5) of the second implement 16.

Referring to FIG. 5, it can be seen that the front hitch means 19 of the second implement 16 resembles the front hitch means 17 of the first implement 10 as shown in FIG. 2, because both are adapted for mounting their respective implement independently on the three-point hitch 12 of a tractor. Actually, the front hitch means 19 of the second implement 16 may be of various designs but generally all include three transverse hitch pins, namely, an upper hitch pin 52 (FIG. 5) and a pair of laterally spaced lower hitch pins 54. Like the front hitch means 17 of the first implement 10, some type of mast 56 and brackets 58 rigidly position the hitch pins 52 and 54, respectively, relative to the frame 60 of the second implement.

Referring again to FIG. 4, the rear three-point hitch means 18 of the first implement 10 basically constitutes a triangular arrangement of connector means situated relative to the implement 10 and to one another to simulate the tractor three-point hitch 12. Accordingly, the rear three-point hitch means includes a pair of laterally spaced draft links 62 (FIGS. 4 and 8) which are rigidly secured to the tool bar 32 and extend rearwardly therefrom. The draft links 62 may be bolted, clamped, welded or otherwise fastened to the tool bar 32 in any manner which provides sufficient strength for the links to support a second implement. Each draft link 62 has an inclined square cutout portion 64 (FIG. 8) for engaging the square shaped tool bar 32 along three sides. The large contact area of the three engaged surfaces tends to fix the position of the draft link vertically and longitudinally relative to the tool bar so as to relieve the load on the welds or other connections between the draft links 62 and tool bar 32.

Lateral stability of the draft links 62 rearwardly of the tool bar 32 is provided first by a cross bar 66 (FIGS. 4 and 8) which, like the tool bar 32, is received within an inclined square cutout portion 68 in the draft links 62 rearwardly of the tool bar and rigidly fastened therein such as by a continuous weld along the three abutting surfaces. Secondly, additional reinforcement for each draft link 62 is provided by a brace plate 69 which extends between and is rigidly connected to the draft link 62 and tool bar 32.

The draft link connectors, indicated generally by reference numeral 70 in FIGS. 7 and 8, include an integral hook 72 formed in a rear end portion of the flat draft link plate 62 for receiving a hitch pin 54 of the second implement 16. Reinforcement for the hook portion 72 may be provided by welding or otherwise fastening a pair of plates 74 on opposite sides of hook 72. The plates 74 conform in shape to the rear end of the draft link 62 and effectively form a wider hook and increase the bending strength of the rear end of the link 62 to prevent lateral deformation.

In other embodiments, a smaller and lighter hook may be suitable. For such applications, a separate hook or other type connector could be bolted, welded or otherwise fastened to the rear end of the draft links 62.

Lock means, indicated generally at 76 in FIGS. 7 and 8, may be releasably positionable over the hooks 72 to prevent the withdrawal of a hitch pin of the second implement 16 from the hooks 72 during use. A lock plate 78 is pivotally connected to the draft link 62 slightly above and in front of the hook portion 72 on a bolt and lock nut assembly 80. The lock plate may be displaced from its respective hook 72 by pivoting it upwardly (counterclockwise) to the dotted line position in FIG. 8 where it does not interfere with the insertion or removal of a hitch pin from the hook 72. Once the hitch pins 54 of a second implement 16 are engaged in the lower hooks 72, the lock plates 78 are pivoted downwardly to the full line position indicated in FIG. 8.

To releasably engage lock plate 78 over the hook 72 in this position, a lock pin 82 (FIG. 7) is insertable through aligned holes in the draft link 62 and lock plate 78 and fastened therein by a cotter pin type fastener 84. The use of some type of lock means on the lower hooks is advantageous since the forces exerted by the hitch pins 54 of a trailing implement may be directed in almost any direction at a given time. For example, a hitch mounted tillage tool may be forced upwardly or downwardly relative to the three-point hitch depending on the particular obstacles encountered in the soil.

A center link 86 (FIGS. 1 and 4) completes the rear three-point hitch connection of the implement 10 of the present invention. To simulate the tractor three-point hitch 12, center link 86 is rigidly mounted on the frame between the closely spaced mast plates 38 by a pair of bolts 88 and extends rearwardly therefrom as shown in the drawing. It is important that the center link 86 also have some type of connector means on its rear end for attachment to the upper hitch pin 52 of a second implement's front hitch means. Thus, a hook 90 is integrally formed in the center link adjacent its rear end. Other means for securely engaging the upper hitch pin 52 of a second implement are also suitable.

In certain embodiments, it may be desirable to have a pivotable center link much like the center arm 26 of the tractor three-point hitch 12. The center link could therefore be pivotally mounted on the mast plates 38 or otherwise relative to the tool bar 32. Connector means presently used for the center arms of tractor three-point hitches would be appropriate.

The front and rear hitch means 17 and 18, respectively, of implement 10 are longitudinally aligned, i.e., the lower hitch pins 36 of the front hitch means 17 are situated at the same height and along the same longitudinal axes as the hooks 72 of the rear hitch means 18. This arrangement allows a straight line of pull from the tractor three-point hitch 12 through the first implement 10 to the second implement 16, thereby minimizing any torsional effects that might arise if the three-point connection to the tractor was at a different height or laterally offset from the three-point connection to the second implement 16.

The tool bar 32 of lead implement 10 is utilized to support a series of tools such as the axially spaced coulter wheels 92, shown in FIGS. 1 and 3. The tools may be spaced along tool bar 32 in any desired pattern or uniform spacing. End plates 94 (FIG. 3) are welded to each end of the tool bar 32 for the attachment of wings 96 which are tool bar extensions for increasing the width of the implement.

In operation, the lead implement 10 is adapted to be mounted on the three-point hitch 12 of a tractor in the usual manner by engaging the upper and lower hitch pins 34 and 36 (FIG. 1) of the front hitch means 17 of first implement 10 in the bored holes 30 and 28, respectively, in the arms of the tractor three-point hitch 12.

The trailing implement 16 may then be mounted on the rear hitch means of lead implement 10 similarly to the manner in which it would otherwise be mounted directly to the tractor three-point hitch 12. This is accomplished by engaging the upper and lower hitch pins 52 and 54 of the front hitch means 19 of the trailing implement 16 in the center link and draft link hooks 90 and 72, respectively, of the lead implement's rear hitch means 18. The result is two hitch mounted implements connected in tandem for towing by a single tractor.

Whereas, the preferred form of the invention has been described herein, it should be realized that there may be many modifications, substitutions and alterations thereto.

We claim:

1. In a tractor and farm implement hitch means including a first implement connectible in a three-point hitch connection in a trailing relation with a tractor having a three-point hitch means and connectible in a three-point hitch connection in a towing relation with a second implement having front hitch means including a pair of transversely spaced hitch pins, the combination comprising:
  (a) said tractor three-point hitch means which includes:
    (1) a center arm, and
    (2) a pair of transversely spaced lift arms pivotally connected to the tractor and extended rearwardly therefrom, and
  (b) said first implement which includes:
    (1) an elongated transverse tool bar,
    (2) a rear three-point hitch means comprising:
      (a) a center link operatively connected to the tool bar and extended rearwardly thereof,
      (b) a connector at the rear end of the center link connectible with the front hitch means of the second implement,
      (c) a pair of draft links rigidly secured to the tool bar and extended rearwardly therefrom at positions below and arranged at opposite sides of the center link,
      (d) a hook connector at the rear end of each draft link, each hook connector having an upwardly facing open side for receiving therein one of the transversely extended hitch pins of the second implement, and
      (e) a lock member releasably positionable over said open side of each hook connector to prevent the removal of said hitch pin therefrom, and
    (3) a front three-point hitch means mounted on the tool bar and attachable to the three-point hitch means on the tractor, said front three-point hitch means having a pair of transversely spaced upstanding mast plates on the tool bar and an upper hitch pin extended between the upper ends of the mast plates for attachment to the center arm of the tractor three-point hitch means, and said center link of the rear three-point hitch means is rigidly connected to the mast plates and extended rearwardly therefrom, and
    (4) the first implement, when alone connected to the three-point hitch means of a tractor, being movable therewith and towed thereby, and when the front three-point hitch means of the second implement is connected to the rear three-point hitch means of the first implement, both of said implements being movable as a unit with and towed by the hitch means of the tractor.

2. A first implement according to claim 1, including:
  (a) a cross bar rigidly connected to and extended between said pair of draft links.

* * * * *